(12) United States Patent
Krena et al.

(10) Patent No.: US 11,724,468 B2
(45) Date of Patent: Aug. 15, 2023

(54) METHOD AND DEVICE FOR MANUFACTURING A PROFILE MEMBER OF COMPOSITE MATERIAL, THE CROSS-SECTION OF WHICH HAS THREE BRANCHES

(71) Applicant: LATECOERE, Toulouse Occitaine (FR)

(72) Inventors: Josef Krena, Lysa nad Labem (CZ); Miloslav Klisky, Prague (CZ)

(73) Assignee: LATECOERE, Toulouse (FR)

( * ) Notice: Subject to any disclaimer, the term of this patent is extended or adjusted under 35 U.S.C. 154(b) by 75 days.

(21) Appl. No.: 17/610,558

(22) PCT Filed: May 21, 2020

(86) PCT No.: PCT/EP2020/064233
§ 371 (c)(1),
(2) Date: Nov. 11, 2021

(87) PCT Pub. No.: WO2020/239611
PCT Pub. Date: Dec. 3, 2020

(65) Prior Publication Data
US 2022/0227075 A1     Jul. 21, 2022

(30) Foreign Application Priority Data

May 28, 2019    (FR) .................................... 1905615

(51) Int. Cl.
*B29C 70/34*      (2006.01)
*B29C 70/46*      (2006.01)
(Continued)

(52) U.S. Cl.
CPC ............ *B29C 70/345* (2013.01); *B29C 70/46* (2013.01); *B29C 70/461* (2021.05); *B29C 70/54* (2013.01);
(Continued)

(58) Field of Classification Search
None
See application file for complete search history.

(56) References Cited

U.S. PATENT DOCUMENTS

2018/0001578 A1    1/2018   Modin

FOREIGN PATENT DOCUMENTS

EP           1481790        12/2004
WO    WO2014200675   12/2014

*Primary Examiner* — Barbara J Musser
(74) *Attorney, Agent, or Firm* — Defillo & Associates, Inc.; Evelyn A. Defillo (57) ABSTRACT

Method and device for manufacturing a profile member of composite material, the cross-section of which has three branches, including the steps of: —moving together two opposite edges of a panel (2) of sheet material in such a manner that these two opposite edges are juxtapositioned in one juxtapositioning direction; translating a pair of jaws (20) in a direction perpendicular to the juxta-positioning direction in such a manner that the pair of jaws (20) is positioned on either side of the opposite juxtapositioned edges, this translational movement of the pair of jaws (20) being carried out in the direction of a base (25); —simultaneously pressing the sheet material between the two jaws (20), on the one hand, and between the jaws (20) and the base (25), on the other hand; —finishing the profile member of composite material by hardening with a matrix with which the sheet material is impregnated.

25 Claims, 7 Drawing Sheets

(51) Int. Cl.
*B29D 99/00* (2010.01)
*B29C 70/54* (2006.01)
*B29K 307/04* (2006.01)
*B29L 31/00* (2006.01)

(52) U.S. Cl.
CPC ...... *B29D 99/0003* (2013.01); *B29K 2307/04* (2013.01); *B29L 2031/001* (2013.01)

METHOD AND DEVICE FOR MANUFACTURING A PROFILE MEMBER OF COMPOSITE MATERIAL, THE CROSS-SECTION OF WHICH HAS THREE BRANCHES

CROSS REFERENCE TO RELATED APPLICATION

This application is a national stage entry of PCT/EP2020/064233 filed May 21, 2020, under the International Convention and claiming priority over French Patent Application No. FR1905615 filed May 29, 2019.

TECHNICAL FIELD

The invention relates to the field of composite materials and more particularly to the methods and devices for manufacturing profiles having a cross section with three branches. The profiles having a cross section with three branches are profiles that are well known for their rigidity and their use in a large number of applications. The profiles having a cross section with three branches are profiles having a cross section with a central junction point and three branches that extend from this junction point. The profiles having a cross section with three branches include, for example, profiles having a T-shaped or Y-shaped cross section.

PRIOR ART

In the prior art, the manufacture of the profiles made of composite material having a cross section with three branches is generally carried out in several steps. For example, two profiles having a cross section with two branches are initially produced. These profiles having a cross section with two branches are for example profiles having an L-shaped cross section. These profiles are easy to produce by simple methods that are known in the field of composite materials. These two profiles are then joined together by adhesive bonding so as to form a single profile having a cross section with three branches. For example, two L-shaped profiles are manufactured and are then joined together by adhesive bonding to form a T-shaped profile.

The methods of the prior art generally include a large number of steps and are therefore expensive. These methods also require several different workstations and therefore involve moving and picking up the parts between the different workstations, this not making it possible, or making it difficult, to produce precision parts. Furthermore, the methods of the prior art result in heterogeneous parts, the strength of which can be improved.

SUMMARY OF THE INVENTION

The aim of the invention is to improve the methods and devices of the prior art. To this end, the invention relates to a method for manufacturing a profile made of composite material having a cross section with three branches, this method including the following steps:

moving two opposite rims of a panel of sheet material toward one another such that these two opposite rims are juxtaposed in a juxtaposing direction;

moving a pair of jaws in translation in a direction perpendicular to the juxtaposing direction such that the pair of jaws is positioned on either side of said juxtaposed opposite rims, this movement in translation of the pair of jaws being effected in the direction of a base;

simultaneously pressing the sheet material between the two jaws for the one part and between the jaws and the base for the other part;

completing the profile made of composite material by curing a matrix impregnating the sheet material.

Another subject of the invention relates to a device for manufacturing a profile made of composite material having a cross section with three branches, this device having:

a support frame for a panel of sheet material, this support frame having:

a rigid surround having a central opening for a panel of sheet material;

two holding members designed to take hold of two opposite rims of a panel of sheet material;

two levers, each supporting one of the holding members, these levers being mounted on the rigid surround so as to pivot between an opened-out position in which the holding members are spaced apart from one another and a folded-up position in which the holding members are juxtaposed in a juxtaposing direction;

a mold provided with two jaws that are movable with respect to one another between a spaced-apart position and a closed-up position;

a counter-mold provided with a base;

the support frame being designed to take up a working position in which it is disposed between the mold and the counter-mold, the mold and the counter-mold being movable with respect to one another, in a direction of translation that is perpendicular to the juxtaposing direction, between a mutual spacing position and a clamping position in which the jaws of the mold are in the closed-up position and are disposed so as to face the base of the counter-mold.

The invention makes it possible to produce a profile made of composite material having a cross section with three branches in a much smaller number of steps and shaping takes place within a single workstation, making it possible to reduce the production costs, to increase productivity or production rates, and to produce more precise parts by virtue of a single shaping operation, following which the final part is obtained.

In one particularly advantageous implementation of the invention, the profile is produced from a single panel of sheet material made up of one or more prepreg sheets, heated beforehand. In this case, the profile is produced, after the panel has been heated, in a single step, the duration of which is of the order of a few minutes.

The invention makes it possible to obtain a homogeneous profile having a cross section with three branches, the makeup of which is identical. These branches all have an optimal position of the layers of sheet material as far as the orientation of the fibers is concerned. Such production results in a particularly solid and durable profile that is stable over time, and does not require any reinforcing insert.

The invention makes it possible to produce different possible forms of profile having a cross section with three branches, and the device according to the invention can be easily modified to obtain a different profile form by simply changing the pair of jaws and the base. The method is thus flexible and adaptable at low cost.

The production method may include the following additional features, on their own or in combination:

the method includes, before the step of moving two opposite rims of a panel of sheet material toward one another, a step of fixing a holding member to each of said opposite rims of the panel of sheet material;

the step of moving two opposite rims of the panel of sheet material toward one another is effected by moving the holding members toward one another and passing them from an opened-out position to a folded-up position;

the method includes a step of superposing sheets of sheet material so as to form the panel of sheet material between the two holding members when they are in the opened-out position;

the method includes, before the step of moving two opposite rims of a panel of sheet material toward one another, a step of heating the panel of sheet material, the panel being made up of prepreg sheets;

the method includes, before the step of moving two opposite rims of a panel of sheet material toward one another, a step of disposing the panel of sheet material between the pair of jaws and the base;

the step of moving one of two opposite rims of a panel of sheet material toward the other is effected during a first phase of moving the pair of jaws toward the base, by the action of activation stems that are fixed with respect to the base;

in the step of simultaneously pressing the sheet material between the two jaws for the one part and between the jaws and the base for the other part, the sheet material is pressed between two mutually parallel surfaces of the jaws, and the sheet material is simultaneously pressed between the base and two surfaces perpendicular to the parallel surfaces of the jaws;

during the step of simultaneously pressing the sheet material between the two jaws for the one part and between the jaws and the base for the other part, the sheet material is pressed against a rib that is situated on the base and forms an indentation in the sheet material;

when the two opposite rims of the panel of sheet material are juxtaposed in a juxtaposing direction, the position of these rims is determined by adjustable stops;

during the step of moving a pair of jaws in translation in a direction perpendicular to the juxtaposing direction, the jaws are simultaneously moved toward one another by the cooperation of oblique edge faces integral with the jaws and of oblique pads that are fixed with respect to the base;

the jaws are urged into their spaced-apart position by return springs.

The manufacturing device may have the following additional features, on their own or in combination:

the holding members are clips that are each formed by two jaw parts and have a clamping means;

the two jaw parts are bars;

the two jaw parts have pins extending between the two jaw parts;

each lever has two mutually parallel arms, each arm being joined to the rigid surround by a pivot pin and the two arms of one and the same lever being joined together by a rod, each holding member being mounted on one of these rods;

each holding member is joined to the corresponding lever by a pivot connection about an axis parallel to the juxtaposing direction;

the rigid surround has stops for the levers in the opened-out position;

the rigid surround has a central support provided with adjustable stops determining the folded-up position of the levers;

the rigid surround has fixing lugs for fixing it to means for moving in translation;

the rigid surround is fixed to means for moving in translation in two directions perpendicular to the juxtaposing direction;

the mold has a mount on which the two jaws are mounted so as to be movable in translation;

the jaws are urged into their spaced-apart position by return springs;

the jaws each have a cavity for bypassing the holding members when the mold and the counter-mold are in their clamping position;

the jaws have oblique edge faces and the counter-mold has a member for moving together that is provided with oblique pads, the oblique edge faces cooperating with the oblique pads in order to close up the jaws when the mold and the counter-mold are moved in translation in the direction of their clamping position;

each jaw has a first surface, the two first surfaces of the jaws being parallel, situated so as to face one another and designed to clamp between one another a panel of sheet material when the jaws are in their closed-up position;

each jaw has a second surface perpendicular to the first surface, the second surfaces of the two jaws being designed to clamp a panel of sheet material between themselves and the base when the mold and the counter-mold are in their clamping position;

the counter-mold has a mount on which the base is mounted in a removable manner;

the counter-mold has a rib fixed to the base and designed to form an indentation;

the support frame has elastic toggle means that urge the levers into one or the other of the opened-out and folded-up positions;

the counter-mold has activation stems that urge the levers from their opened-out position to their folded-up position when the mold and the counter-mold are moved in translation in the direction of their clamping position;

the support frame has: a working position in which it is disposed between the mold and the counter-mold; and a preparation position in which it is spaced apart from the space between the mold and the counter-mold.

BRIEF DESCRIPTION OF THE FIGURES

Further features and advantages of the invention will become apparent from the following description thereof, given by way of nonlimiting indication, with reference to the appended drawings, in which.

DETAILED DESCRIPTION

An embodiment of a manufacturing method implemented using a manufacturing device will be described with reference to FIGS. 1 to 8. This method and this device make it possible to manufacture a profile made of composite material having a cross section with three branches.

Figure 1:
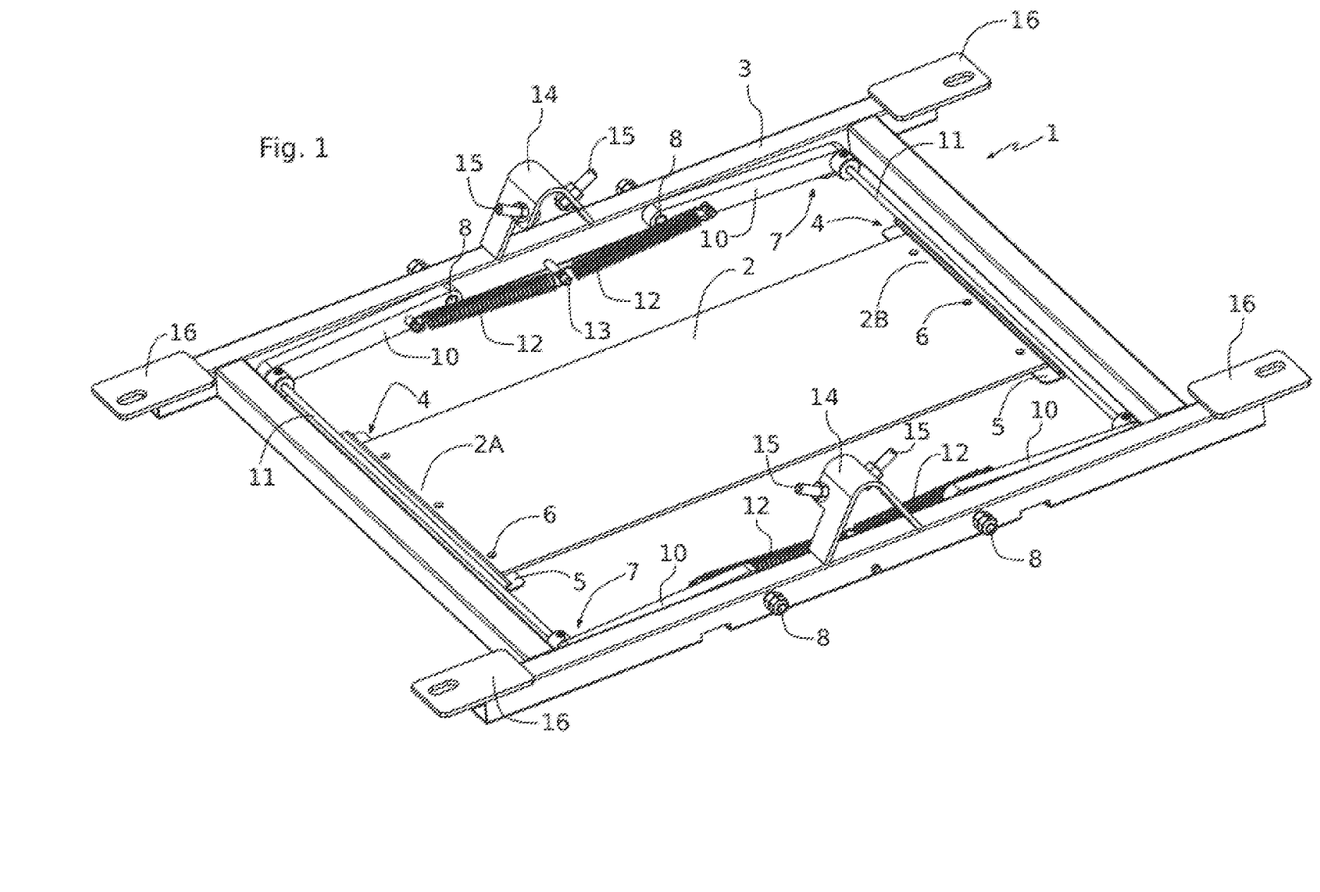
FIG. 1 shows the support frame, in the opened-out position, of a manufacturing device according to one embodiment of the invention.

FIG. 1 shows a support frame 1, which is one of the elements that make up a manufacturing device according to the invention. The support frame 1 is provided to support and manipulate a panel 2 of sheet material. The panel 2 is a source material in the form of a plate, the dimensions of which are suitable for the production of the final part. This panel 2 of sheet material is intended to make up the reinforcement of the profile during production, this reinforcement being impregnated with a matrix (for example a resin) in order to form the final part made of composite material. The panel 2 of sheet material is chosen depending on the type of reinforcement desired for the composite material of the final part. The panel 2 generally has one or more reinforcing sheets for composite material such as woven or nonwoven glass- or carbon-fiber sheets. In the present example, the panel 2 of sheet material is formed by a superposition of eight woven carbon-fiber sheets. The panel 2 of sheet material is a flexible panel, at least when it is heated to the temperature required for the method, meaning that it can undergo deformations during the manufacturing method. In the present example, the panel 2 is made from prepreg sheets, commonly employed in the field of composite materials. Such a panel 2 made up of reinforcing prepreg sheets already comprises the matrix of the future part made of composite material in the form of fillers distributed within the reinforcing sheets.

The support frame 1 has a rigid surround 3 and two holding members 4 which are designed to take hold of two opposite rims 2A, 2B of the panel 2.

The holding members 4 may be made up of any means for taking hold of and holding the panel 2 by way of its rims 2A, 2B. These holding members 4 may include for example elastic clips, mechanical clamping or gripping means, adhesive holding means, etc. In the present example, the holding members 4 are each made up of a clip formed by two jaw parts 5. The two jaw parts 5 are in this case formed by two metal bars provided with a clamping means for clamping the rims 2A, 2B between the bars. The clamping means is for example an elastic element or a lever mechanism. In FIG. 1, only the lower jaw part 5 is visible for each holding member 4. In the present example, in order to reinforce the holding of the panel 2 by the holding members 4, the latter each have three pins 6 that extend between the two jaw parts 5 and perforate the panel 2 all the way through.

Figure 2:
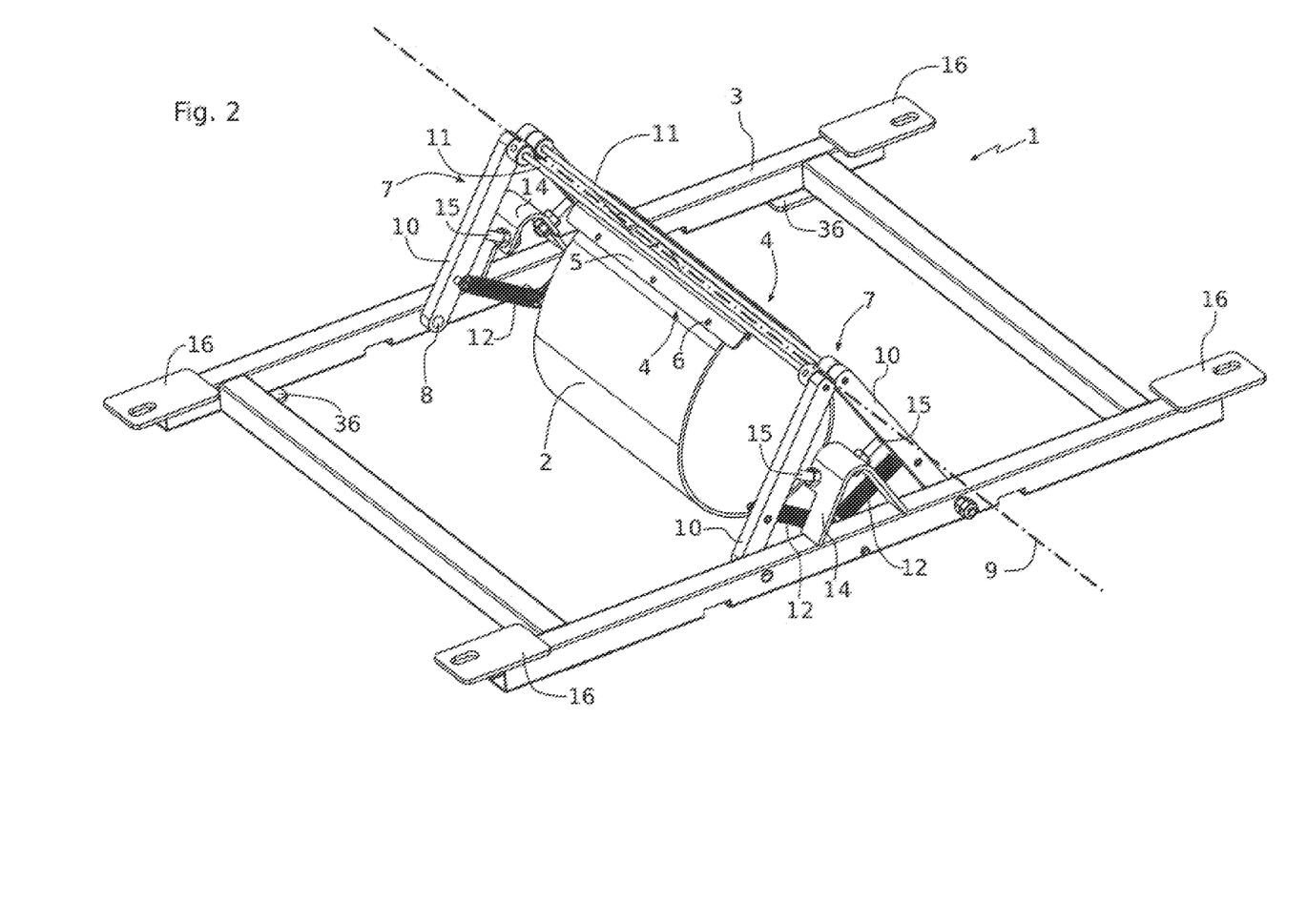
FIG. 2 shows the support frame from FIG. 1 in the folded-up position.

Each holding member 4 is mounted on a lever 7 which is mounted on the rigid surround 3 so as to pivot. With reference to FIGS. 1 and 2, the two levers 7 are mounted on the rigid surround 3 so as to pivot by virtue of pivot pins 8, so as to be able to take up two stable positions:

a position known as the opened-out position (shown in FIG. 1) in which the holding members 4, which are carried by the levers 7, are spaced apart from one another to the maximum extent and hold the panel 2 in an opened position;

a position known as the folded-up position in which the levers 7 have been pivoted toward one another such that the holding members 4 are juxtaposed in a juxtaposing direction 9 (see FIG. 2).

In the folded-up position, the two holding members 4 are either in contact with one another or exhibit a small gap of a few millimeters between one another so that they do not collide. The juxtaposing direction 9 is defined here as being an axis that is parallel to the direction in which the bars that make up the jaw parts 5 extend, and which is situated between the two holding members 4 in the juxtaposed position. The position of the juxtaposing direction is therefore determined by the position of the holding members when they are in the juxtaposed position, this position being determined by the shape of the levers 7 and the position of the pivot pins 8.

In the folded-up position, the flexible panel 2 forms a loop between its two juxtaposed rims 2A, 2B.

In the present example, the levers 7 are each made up of two parallel arms 10 that are each mounted on one of the pivot pins 8. A rod 11 is also disposed between these two arms 10. For each lever 7, the holding member 4 is mounted on this rod 11.

The holding member 4 is mounted such that it is connected to the corresponding lever 7 by a pivot connection about an axis parallel to the juxtaposing direction 9. For each lever 7, the holding member 4 can be mounted on the rod 11 so as to pivot or, as a variant, the holding member 4 can be fixed to the rod 11 while the latter is connected to the two arms 10 by pivot connections at each of its ends.

The support frame 1 additionally has two pairs of tension springs 12 that ensure the stability of the two, opened-out and folded-up positions. Each of the springs 12 is tensioned between a central finger 13 of the surround 3 and one of the arms 10. The position of the fingers 13 and of the springs 12 is chosen such that the lever 7 behaves in the manner of a toggle. Specifically, in the present example, the fingers 13 are situated under the straight line connecting the two pivot pins 8 to each edge of the surround 3. Thus, when the support frame 1 is in its opened-out position, the springs 12 pull the levers 7 downward (with reference to the position shown in FIG. 1). Conversely, when the support frame 1 is in its folded-up position, the springs 12 pull the levers 7 upward (with reference to the position shown in FIG. 2). The surround 3 has stops 36 for the opened-out position and stops 15 for the folded-up position.

In the opened-out position illustrated in FIG. 1, the springs 12 urge the levers 7 downward against the stops 36 and thereby ensure the stability of this opened-out position.

The support frame 1 additionally has two central supports 14 that each support two adjustable stops 15. In the folded-up position illustrated in FIG. 2, the levers 7 are each disposed against the adjustable stops 15, the springs 12 then urging the levers 7 toward one another, and against these adjustable stops 15. The possibility of adjusting the stops 15 makes it possible to adjust any spacing desired between the holding members 4 in this folded-up position. The springs 12 thus also ensure the stability of the folded-up position by urging the two levers 7 against the adjustable stops 15 in the folded-up position.

The support frame 1 can be combined with means for moving it during the production method. In the present example, the surround 3 has fixing lugs 16 that allow the support frame 1 to be, for example, mounted on movement means such as rails allowing it to move in translation in two directions perpendicular to the juxtaposing direction, in this case the two, horizontal and vertical directions (these rails are not shown in the figures).

Figure 3:
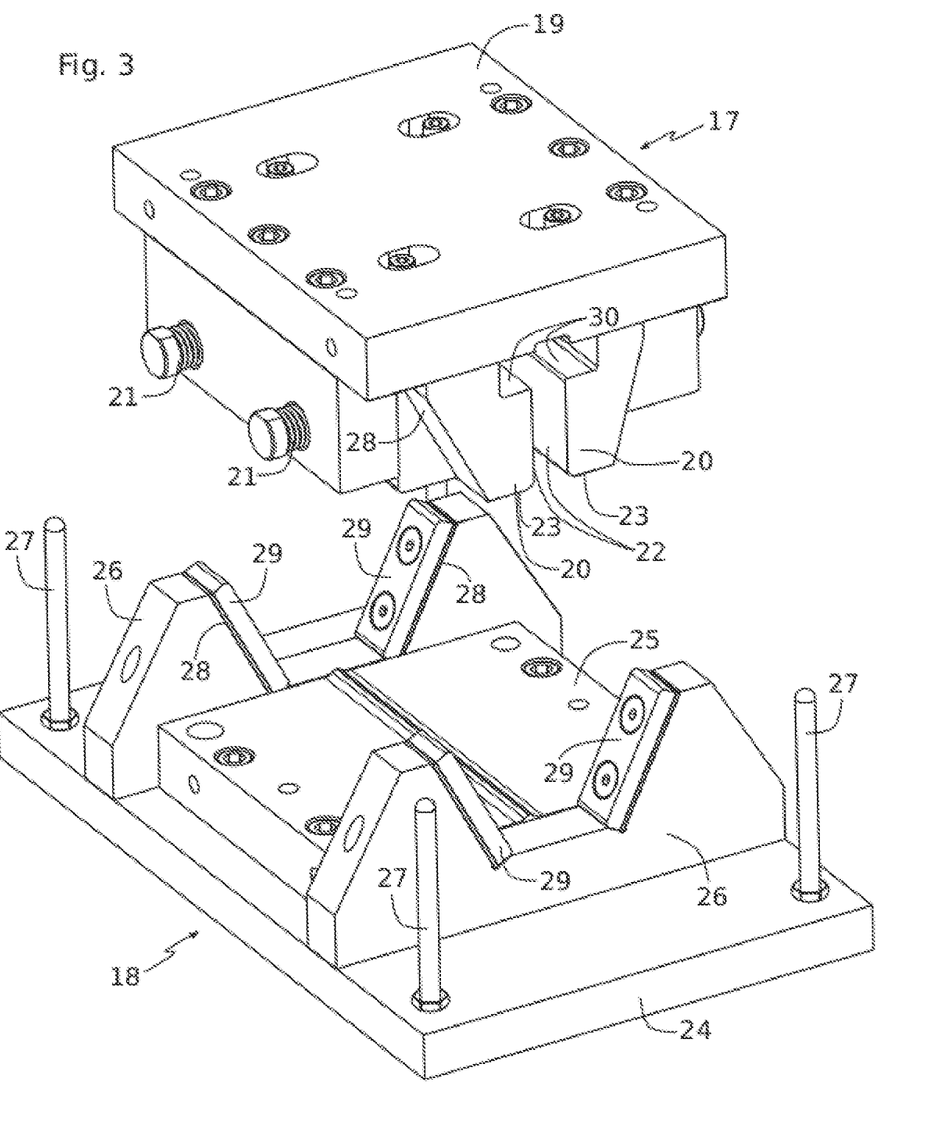
FIG. 3 shows the mold and the counter-mold of a manufacturing device according to one embodiment of the invention.

FIG. 3 shows further constituent elements of the manufacturing device according to the invention. This figure illustrates a mold 17 and a counter-mold 18 which, in combination with the support frame 1, make it possible to implement the method.

The mold 17 has a mount 19 supporting two movable jaws 20. The two jaws are movable in translation between a spaced-apart position in which the two jaws 20 are spaced apart from one another to a maximum extent until coming into abutment against the mount 19 (this being the position illustrated in FIG. 3) and a closed-up position obtained after the jaws 20 have been moved toward one another. To this end, the jaws 20 are therefore mounted so as to be movable in translation in a horizontal direction (in the orientation shown in FIG. 3) on the mount 19, by way of a sliding connection or any other suitable means.

The mold 17 also has return springs 21 which cross the mount 19 and which are fixed to the mount 19 on one side and to the jaws 20 on the other side, such that each jaw 20 is permanently urged into its spaced-apart position by the return springs 21.

Each jaw 20 has in this case two working surfaces: a first surface known as the parallel surface 22 and a second surface known as the perpendicular surface 23.

The two parallel surfaces 22 are mutually parallel flat surfaces and remain mutually parallel regardless of the position of the jaws 20, spaced apart or closed up. The parallel surfaces 22 are disposed so as to face one another.

For their part, the two perpendicular surfaces 23 are situated in one and the same plane. The perpendicular surfaces 23 are in this case flat surface which are perpendicular to the parallel surfaces 22. Such jaws 20 make it possible to produce a profile having a T-shaped cross section. The shape of the parallel surfaces 22 and perpendicular surfaces 23 can be easily adapted to form other profiles having a cross section with three branches, such as a Y-shaped profile. Other types of composite-material profile having a cross section with three branches can be obtained with the same manufacturing device, simply by changing the jaws 20, which are mounted in a removable manner on the mount 19.

The jaws 20 additionally have oblique edge faces 28 for controlling their passage from the spaced-apart position to the closed-up position. In FIG. 3, only one oblique edge face 28 is visible for each jaw 20, it being understood that each jaw 20 has another oblique edge face 28 disposed symmetrically at its opposite end from the oblique edge face 28 that is visible in FIG. 3.

The jaws 20 additionally each have a cavity 30 that extends along the entire length of the jaws 20 and makes it possible to bypass the holding members 4 when the mold and the counter-mold are in the clamping position, as explained below.

The counter-mold 18 has a mount 24 on which a base 25, two members 26 for moving together, and four activation stems 27 are mounted.

The base 25 has a flat surface suitable for producing a profile having a T-shaped cross section, according to the present example. In the same way as for the jaws 20, the shape of this base 25 can be easily adapted to produce other types of composite-material profile having a cross section with three branches, such as a profile having a Y-shaped cross section. The base 25 is mounted removably on the mount 24 and can thus be changed easily. In the present example, the surface of the base 25 is parallel to the plane containing the perpendicular surfaces 23 of the jaws 20.

The two members 26 for moving together are mounted on either side of the base 25, facing the oblique edge faces 28 of the jaws 20. The members 26 for moving together each bear two oblique pads 29 made preferably from a material with a low coefficient of friction. The pads 29 are oriented obliquely in the same way as the oblique edge faces 28 of the jaws 20. In other words, the angle formed by each pad 29 and the vertical is equal to the angle formed between each oblique edge face 28 and the vertical. Each oblique edge face 28 is parallel to the pad 29 that faces it. The pads 29 exhibit the same angle with respect to the moving-together direction (in this case the vertical) as the oblique edge faces.

The oblique edge faces 28 and the pads 29 are disposed so as to face one another, meaning that if the mold 17 is moved toward the counter-mold 18, each oblique edge face comes into contact with the pad 29 that faces it.

The activation stems 27 are vertical rigid stems that are fixed in the mount 24 and positioned so as to be able to activate the change in position of the levers 7 of the support frame 1, as explained below.

An example of a method for manufacturing a profile made of composite material having a T-shaped cross section will now be described, employing the device that has just been described.

In a first step, illustrated with reference to FIG. 1, the panel 2 of sheet material is fitted in the support frame 1. The panel 2 may be formed outside the support frame 1 by stacking layers of sheet material, then be fitted between the holding members 4 such that each pair of jaw parts 5 clamps the corresponding end 2A, 2B of the panel 2. Alternatively, the material sheets may be directly draped in the support frame 1 in order to form the panel 2. The material sheets can thus be fixed one by one to the pins 6 and, when the panel 2 is complete, the jaw parts 5 can then be closed. Other systems for fixing the panel 2 to the rods 11 or to the arms 10 can alternatively be used.

In this exemplary embodiment, with the panel 2 being made from reinforcing prepreg sheets, the support frame 1 can be moved in translation inside an oven with the aid of the above-described rails. The panel 2 is thus heated directly in the oven so as to activate or blend the resin of the prepreg sheet materials.

The mobility of the support frame 1 thus allows it to take up one or more preparation positions for fitting the panel 2 and/or bringing it to temperature by heating.

Figure 4:
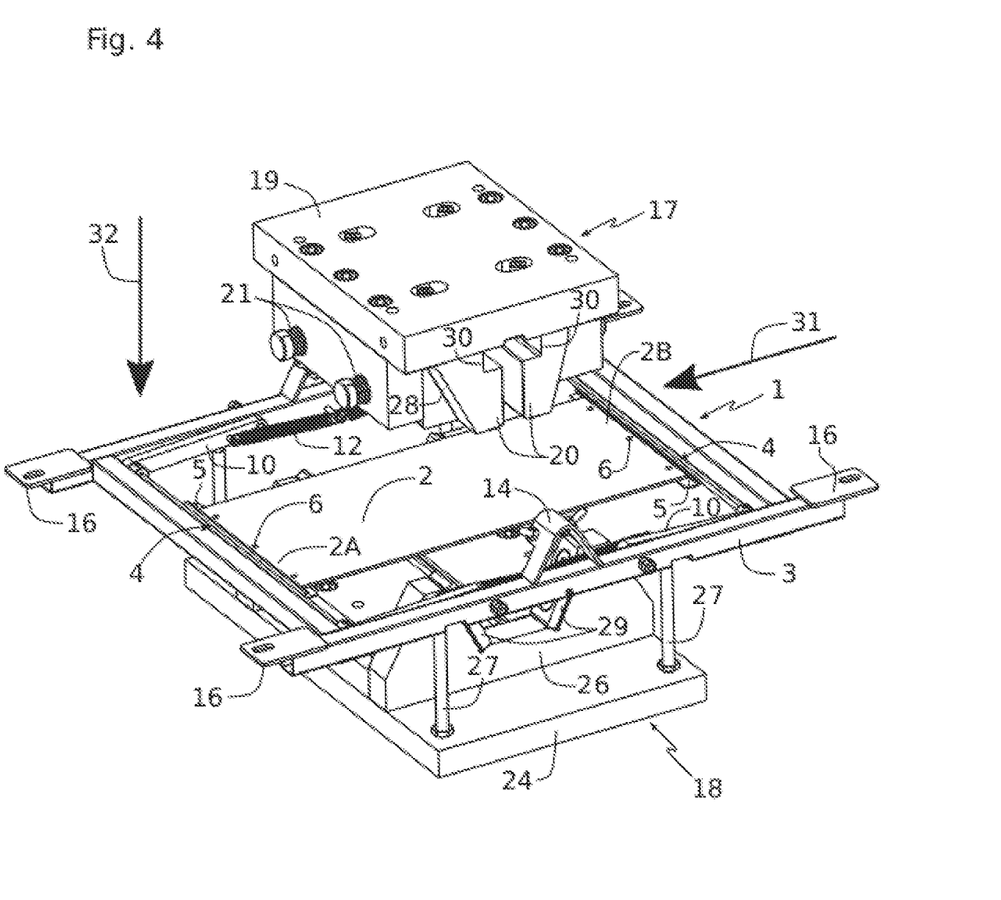
FIG. 4 shows the support frame from FIG. 1, and the mold and the counter-mold from FIG. 3.

In a second step illustrated in FIG. 4, the support frame 1 is removed from the oven and moved in translation horizontally in a direction 31 toward a working position in which it is positioned between the mold 17 and the counter-mold 18.

The support frame 1 is then moved in translation vertically downward in the direction 32.

The activation stems 27 are positioned so as each to face an arm 10 such that, when the support frame 1 is moved in translation downward, during a first phase of moving the mold 17 and the counter-mold 18 toward one another, each activation stem pushes one of the arms 10 upward. Given the toggle-device behavior of the levers 7, the activation stems 27 initially push the arms 10 until they reach their position in which they change their point of equilibrium, in which the arm 10 is aligned with the straight line connecting its pivot pin 8 to its finger 13. When the activation stems 27 push the arms 10 beyond this equilibrium position, the springs 12 then act in a moving-together manner between the two levers 7, which then pass into their folded-up position (see FIG. 5).

The vertically downward movement in translation of the support frame 1, that is to say in the direction of the base 25, is stopped depending on the configuration desired for the profile. Specifically, the distance between the holding members 4 in their juxtaposed position and the base 25 determines the length of one of the branches of the cross section of the finished profile.

Figure 6:
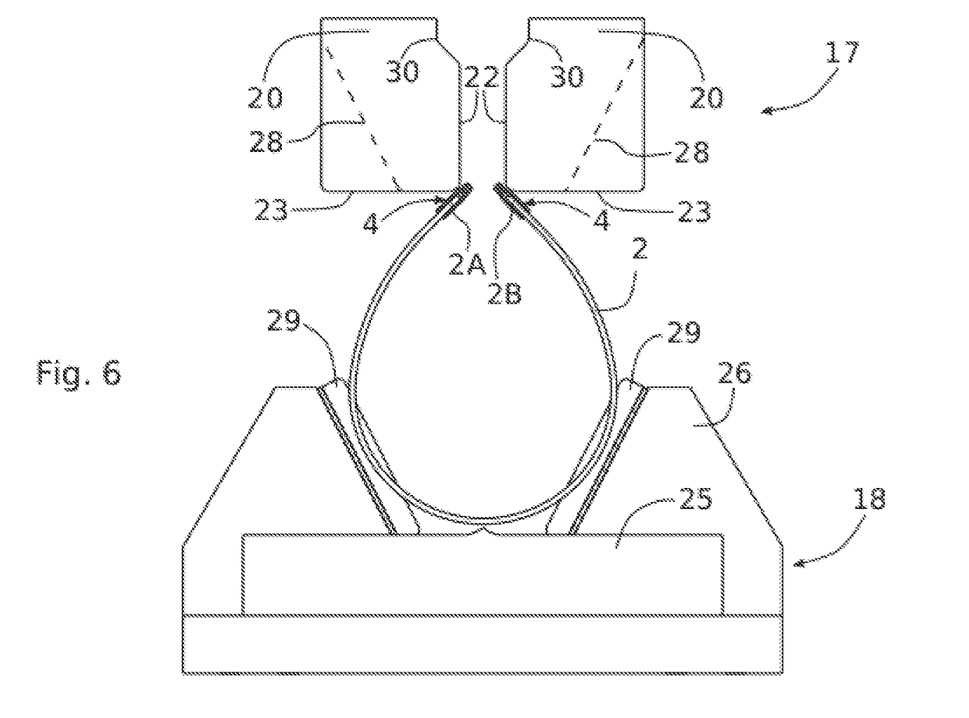
FIG. 6 shows a step in the manufacturing method according to one embodiment of the invention.
Figure 7:
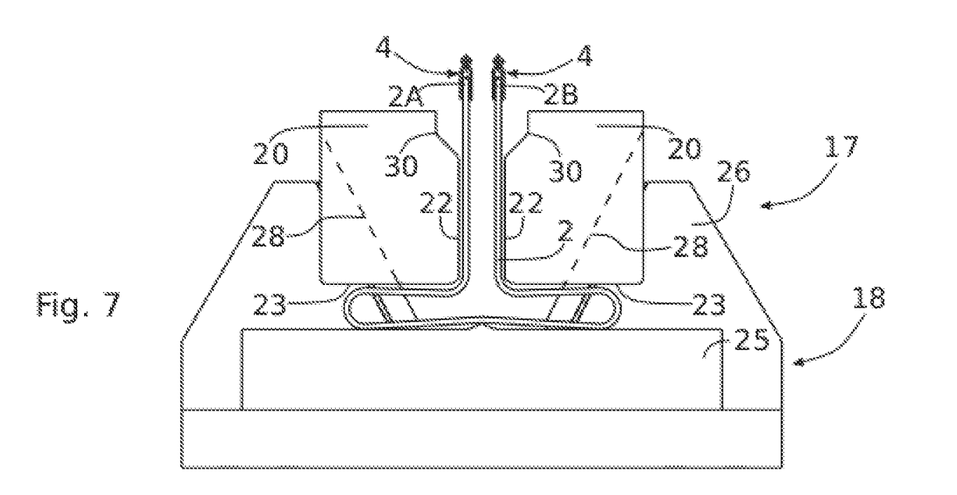
FIG. 7 shows another step in the manufacturing method according to one embodiment of the invention.
Figure 8:
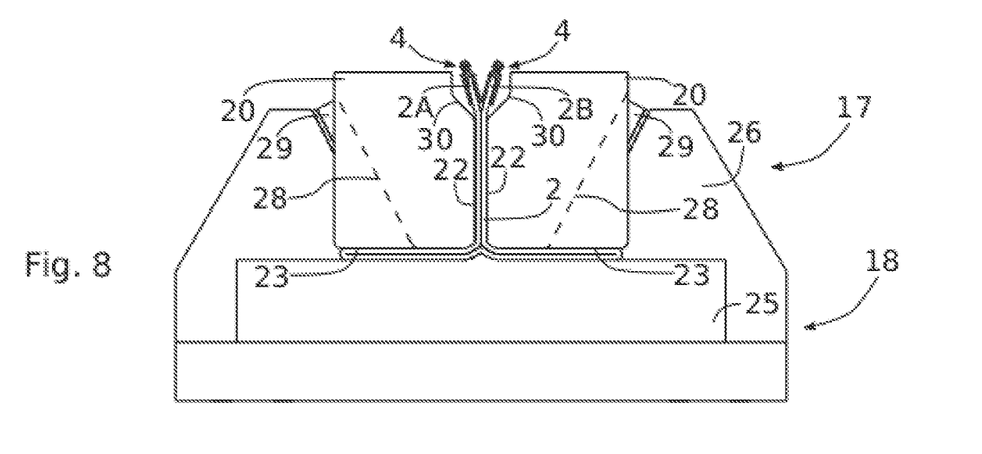
FIG. 8 shows another step in the manufacturing method according to one embodiment of the invention.

FIGS. 6 to 8 are schematic side views illustrating the sequence of operations of the manufacturing method.

Figure 5:
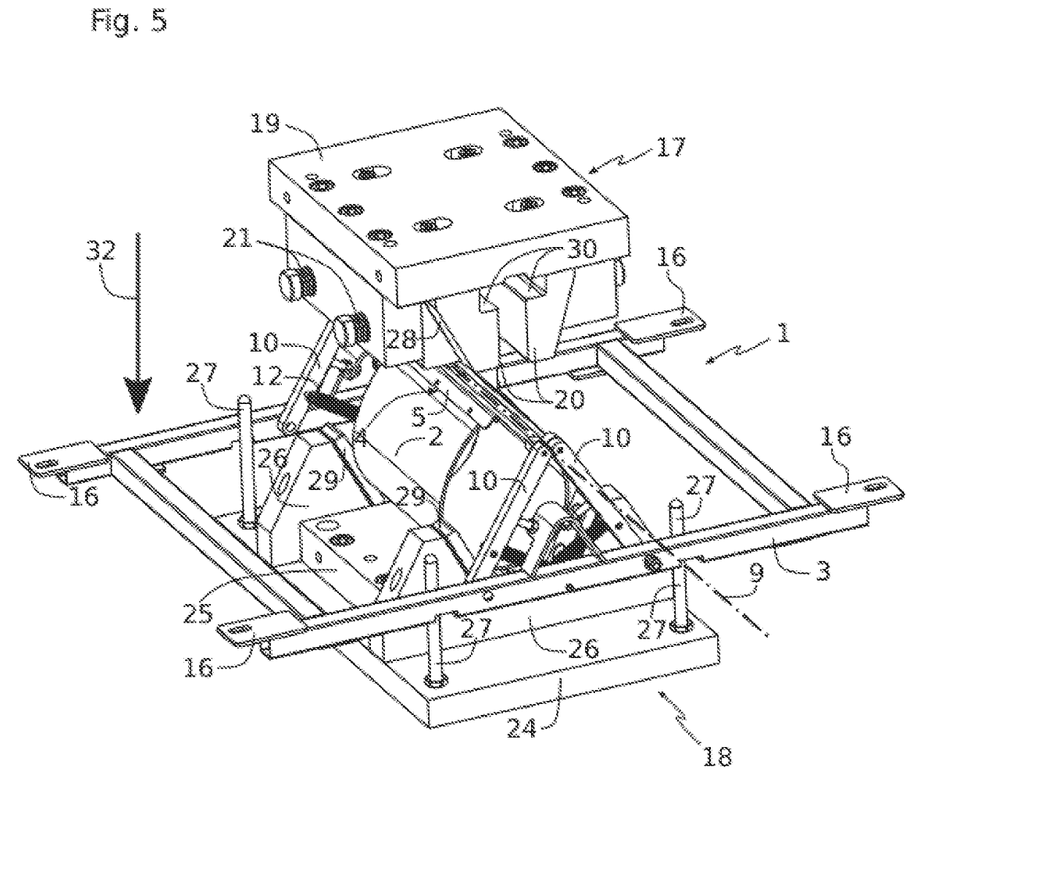
FIG. 5 shows the assembly from FIG. 4 in which the support frame is in the folded-up position.

Starting from the position illustrated in FIG. 5, the mold 17 will then be moved toward the counter-mold 18, and therefore toward the base 25. As illustrated in FIG. 6, the jaws 20 are still in their spaced-apart position under the effect of the return springs 21. The jaws 20 are moved in translation in the direction of the base 25 and engage on either side of the juxtaposed holding members 4. Although the jaws 20 are in their spaced-apart position under the effect of the return springs 21, the parallel surfaces 22 and perpendicular surfaces 23 start to shape the panel 2, which is in the form of a loop, by moving the portions of the panel 2 toward one another during the downward movement in translation of the jaws 20.

With reference to FIG. 7, the downward movement in translation of the jaws 20, in the direction of the base 25, results in a position in which the oblique edge faces 28 of the jaws 20 come into contact with the pads 29 of the members 26 for moving together. Starting from this position, the identical inclinations in pairs of the oblique edge faces 28 and pads 29 cause the jaws 20 to be moved toward one another while the jaws 20 are moved toward the base 25, each oblique edge face 28 sliding over a pad 29.

The movement in translation of the mold 17 toward the counter-mold 18 continues as far as the position in FIG. 8 in which the mold 17 and the counter-mold 18 have reached their final mutual position determining the thickness desired for the three branches in cross section of the profile being manufactured. In this position, the sheet material is pressed simultaneously between the two jaws 20 for the one part and between the jaws 20 and the base 25 for the other part. This position corresponds to a clamping position in which the jaws 20 of the mold 17 are in a closed-up position and are disposed so as to face the base 25 of the counter-mold 18, at a distance corresponding to the thickness desired for the part in the region in question.

This final position is determined by the abutment of the jaws 20 against the members 26 for moving together. The cavities 30 of the jaws 20 are provided to allow the clamping of the panel 2 and the shaping thereof without the jaws 20 touching the holding members 4.

With the panel 2 thus being shaped and held clamped between the jaws 20 and the base 25, according to FIG. 8, a final operation of curing or consolidating the matrix of composite material is then implemented. In the present example, since the panel 2 is formed of prepreg sheets which have previously been placed in the oven, this final step consists in controlled cooling of the part. In practice, this curing or consolidation time is of the order of a minute.

In a variant, if the panel 2 is only produced from one or more dry reinforcing sheets (without being pre-impregnated), a liquid resin may be poured so as to impregnate the reinforcement when the device is in its position in FIG. 8. The resin matrix is then cured by any known means.

The final part is then demolded simply by moving the mold 17 away from the counter-mold 18, this also causing the jaws 20 to move apart under the effect of the return springs 21. The holding members 4 are then detached from the finished part, or the finished part is cut at this level and the finished part can then be removed from the device.

In a variant, the holding members 4 can be detached from the levers 7 and remain on the final part, thereby providing a means for gripping and positioning the final part for example for subsequent machining or finishing operations. In this case, the holding members 4 are detachable from the rods 11 or the rods 11 are detachable from the arms 10.

Figure 9:
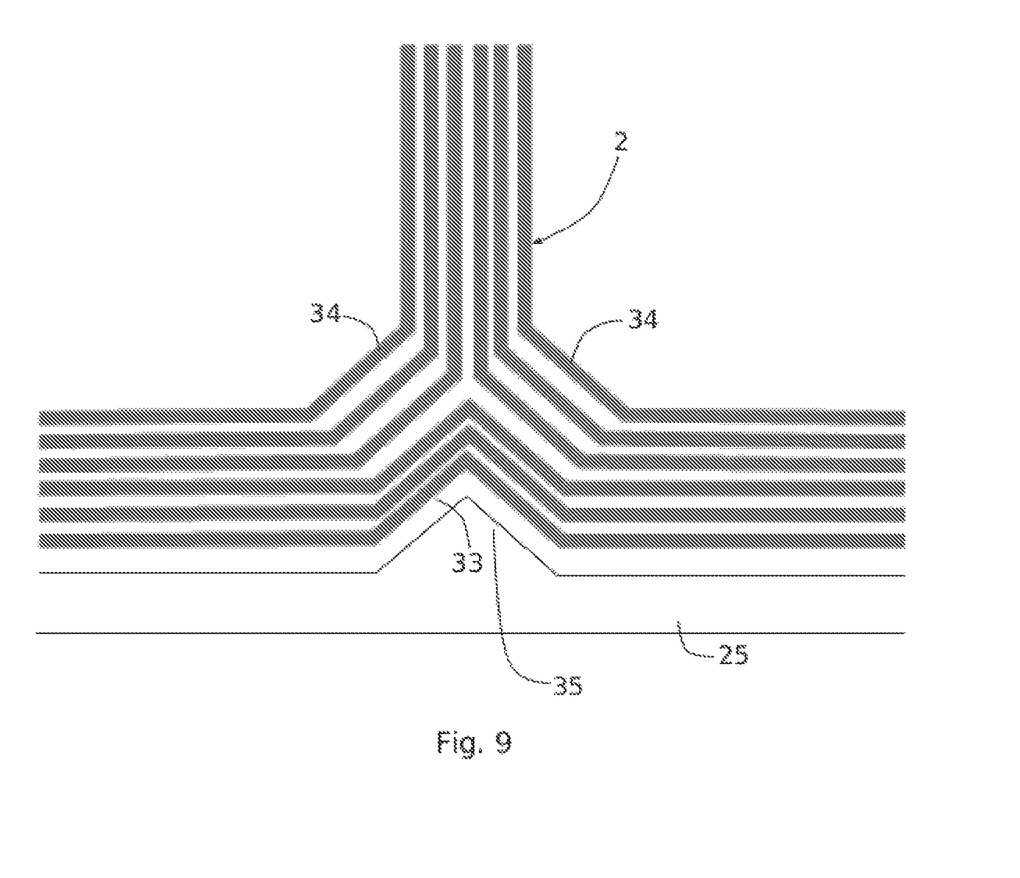
FIG. 9 shows a profile having a cross section with three branches, obtained according to the invention.

Variants in the shape of the profile made of composite material having a cross section with three branches can be implemented, for example the Y shape shown in FIG. 9. FIG. 9 illustrates a cross section of a profile obtained with the same methods and devices as described above, except that the jaws and the base have been changed. The profile in FIG. 9 was obtained from a panel 2 made from a superposition of three sheets of sheet material.

In the example in FIG. 9, the base 25 is provided with a rib 35, the cross section of which is triangular and which makes it possible to form an indentation 33 in the final part, thereby making it easier to produce a profile without internal defects. The jaws 20 for producing the profile in FIG. 9 each comprise a bevel between their parallel surface 22 and their perpendicular surface 23, this bevel corresponding to the oblique connection 34 of the part.

Embodiment variants of the device and of the manufacturing method can be envisioned without departing from the scope of the invention, for example any shape of jaw 20 and of base 25 can be provided depending on a profile that is intended to be obtained. The parallel surfaces 22 and perpendicular surfaces 23 and also the surface of the base 25 may for example be printed with patterns or undulations rather than being flat surfaces. The three branches of the profile that are obtained may additionally exhibit a different angle than those presented here by way of example, by modifying for example the direction in which the mold and the counter-mold are moved toward one another and by adapting the oblique edge faces 28 and the position of the pads 29 as a consequence.

The invention claimed is:

1. A method for manufacturing a profile made of composite material having a cross section with a vertical part and a horizontal part, the method comprising the steps of:
   moving two opposite rims (2A, 2B) of a panel (2) of sheet material toward one another such that the two opposite rims (2A, 2B) are juxtaposed in a juxtaposing direction (9);
   moving a pair of jaws (20) in translation in a direction perpendicular to the juxtaposing direction (9) such that the pair of jaws (20) is positioned on either side of said juxtaposed opposite rims (2A, 2B), the movement in translation of the pair of jaws (20) being effected in the direction of a base (25);
   simultaneously pressing the sheet material between the two jaws (20) the make the vertical part and between the jaws (20) and the base (25) to make the horizontal part;
   completing the profile made of composite material by curing a matrix impregnating the sheet material.

2. The method as claimed in claim 1, comprising:
   before the step of moving two opposite rims (2A, 2B) of a panel (2) of sheet material toward one another, a step of fixing a holding member (4) to each of said opposite rims (2A, 2B) of the panel (2) of sheet material;
   the step of moving two opposite rims (2A, 2B) of the panel (2) of sheet material toward one another is effected by moving the holding members (4) toward one another and passing them from an opened-out position to a folded-up position.

3. The method as claimed in claim 2, comprising a step of superposing sheets of sheet material so as to form the panel (2) of sheet material between the two holding members (4) when they are in the opened-out position.

4. The method as claimed in one of claim 1, comprising before the step of moving two opposite rims (2A, 2B) of a panel (2) of sheet material toward one another, a step of heating the panel (2) of sheet material, the panel (2) being made up of prepreg sheets.

5. The method as claimed in one of claim 1, wherein the step of moving one of two opposite rims (2A, 2B) of a panel (2) of sheet material toward the other is effected during a first phase of moving the pair of jaws (20) toward the base (25), by the action of activation stems (27) that are fixed with respect to the base (25).

6. The method as claimed in one of claim 1, wherein the step of simultaneously pressing the sheet material between the two jaws (20) for the vertical part and between the jaws (20) and the base (25) for the horizontal part, the sheet material is pressed between two mutually parallel surfaces (22) of the jaws (20), and in that the sheet material is simultaneously pressed between the base (25) and two surfaces (23) perpendicular to the parallel surfaces (22) of the jaws (20).

7. The method as claimed in claim 1, wherein during the step of simultaneously pressing the sheet material between the two jaws (20) for the vertical part and between the jaws (20) and the base (25) for the horizontal part, the sheet material is pressed against a rib (35) that is situated on the base (25) and forms an indentation (33) in the sheet material.

8. The method as claimed in claim 1, wherein during the step of moving a pair of jaws (20) in translation in a direction perpendicular to the juxtaposing direction (9), the jaws (20) are simultaneously moved toward one another by the cooperation of oblique edge faces (28) integral with the jaws (20) and of oblique pads (29) that are fixed with respect to the base (25).

9. The method as claimed in claim 8, wherein the jaws (20) are urged into their spaced-apart position by return springs (21).

10. A device for manufacturing a profile made of composite material having a cross section with three branches, the device comprising:
   a support frame (1) for a panel (2) of sheet material, the support frame (1) having:
   a rigid surround (3) having a central opening for the panel (2) of sheet material;
   two holding members (4) designed to take hold of two opposite rims (2A, 2B) of the panel (2) of sheet material;
   two levers (7), each supporting one of the holding members (4), the levers (7) being mounted on the rigid surround (3) so as to pivot between an opened-out position in which the holding members (4) are spaced apart from one another and a folded-up position in which the holding members (4) are juxtaposed in a juxtaposing direction (9);
   a mold (17) provided with two jaws (20) that are movable with respect to one another between a spaced-apart position and a closed-up position;
   a counter-mold (18) provided with a base (25);
   the support frame (1) being designed to take up a working position in which it is disposed between the mold (17) and the counter-mold (18),
   the mold (17) and the counter-mold (18) being movable with respect to one another, in a direction of translation that is perpendicular to the juxtaposing direction (9), between a mutual spacing position and a clamping position in which the jaws (20) of the mold (17) are in the closed-up position and are disposed so as to face the base (25) of the counter-mold (18).

11. The device as claimed in claim 10, wherein the holding members (4) are clips that are each formed by two jaw parts (5) and have a clamping device.

12. The device as claimed in either of claim 10, wherein the two jaw parts (5) are bars.

13. The device as claimed in claim 10, wherein each lever (7) has two mutually parallel arms (10), each arm being joined to the rigid surround (3) by a pivot pin (8) and the two arms of one and the same lever being joined together by a rod (11), each holding member (4) being mounted on one of these rods (11).

14. The device as claimed in claim 10, wherein each holding member (4) is joined to the corresponding lever (7) by a pivot connection about an axis parallel to the juxtaposing direction (9).

15. The device as claimed in claim 10, wherein the rigid surround (3) has stops (36) for the levers (7) in the opened-out position.

16. The device as claimed in claim 10, wherein the rigid surround (3) has a central support (14) provided with adjustable stops (15) determining the folded-up position of the levers (7).

17. The device as claimed in claim 10, wherein the rigid surround (3) has fixing lugs (16) for fixing into adevice for moving in translation.

18. The device as claimed in claim 10, wherein the rigid surround (3) is fixed to a device for moving in translation in two directions perpendicular to the juxtaposing direction (9).

19. The device as claimed in claim 10, wherein the mold (17) has a mount (19) on which the two jaws (20) are mounted so as to be movable in translation.

20. The device as claimed in claim 10, wherein the jaws (20) each have a cavity (30) for bypassing the holding members (4) when the mold (17) and the counter-mold (18) are in their clamping position.

21. The device as claimed in claim 10, wherein each jaw (20) has a first surface (22), the two first surfaces (22) of the jaws (20) being parallel, situated so as to face one another and designed to clamp between one another the panel (2) of sheet material when the jaws (20) are in their closed-up position and in that each jaw (20) has a second surface (23) perpendicular to the first surface (22), the second surfaces (23) of the two jaws (201 being designed to clamp the panel (2) of sheet material between themselves and the base (25) when the mold (17) and the counter-mold (18) are in their clamping position.

22. The device as claimed in claim 10, wherein the counter-mold (18) has a mount (24) on which the base (25) is mounted in a removable manner.

23. The device as claimed in claim 10, wherein the support frame (1) has elastic toggle device (12) that urge the levers (7) into one or the other of the opened-out and folded-up positions.

24. The device as claimed in claim 10, wherein the counter-mold (18) has activation stems (27) that urge the levers (7) from their opened-out position to their folded-up position when the mold (17) and the counter-mold (18) are moved in translation in the direction of their clamping position.

25. The device as claimed in claim 10, wherein the support frame (1) has:
   a working position in which it is disposed between the mold (17) and the counter-mold (18);
   a preparation position in which it is spaced apart from the space between the mold (17) and the counter-mold (18).

\* \* \* \* \*